(12) United States Patent
Dohner et al.

(10) Patent No.: US 11,306,244 B2
(45) Date of Patent: *Apr. 19, 2022

(54) TWO-DIMENSIONAL PEROVSKITE PHOSPHOR AND METHOD OF FORMATION

(71) Applicant: The Board of Trustees of the Leland Stanford Junior University, Stanford, CA (US)

(72) Inventors: Emma Rose Dohner, Portola Valley, CA (US); Hemamala Indivari Karunadasa, Palo Alto, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 131 days.

This patent is subject to a terminal disclaimer.

(21) Appl. No.: 16/142,756

(22) Filed: Sep. 26, 2018

(65) Prior Publication Data

US 2019/0023983 A1  Jan. 24, 2019

Related U.S. Application Data

(63) Continuation of application No. 15/031,561, filed as application No. PCT/US2014/061946 on Oct. 23, 2014, now Pat. No. 10,087,366.

(60) Provisional application No. 62/039,663, filed on Aug. 20, 2014, provisional application No. 61/894,553, filed on Oct. 23, 2013.

(51) Int. Cl.
*C09K 11/66* (2006.01)
*C09K 11/08* (2006.01)

(52) U.S. Cl.
CPC ............ *C09K 11/664* (2013.01); *C09K 11/08* (2013.01); *C09K 11/66* (2013.01); *Y02B 20/00* (2013.01)

(58) Field of Classification Search
CPC ........ C09K 11/664; C09K 11/08; C09K 11/66
See application file for complete search history.

(56) References Cited

U.S. PATENT DOCUMENTS

| 5,871,579 A * | 2/1999 | Liang ...................... C23C 14/06 117/68 |
| 5,882,548 A * | 3/1999 | Liang .................... C09K 11/664 252/301.16 |
| 6,150,536 A | 11/2000 | Chondroudis et al. |

(Continued)

FOREIGN PATENT DOCUMENTS

WO   2015/061555 A1   4/2015

OTHER PUBLICATIONS

Li et al. "Novel <110>-Oriented Organic-Inorganic Perovskite Compound Stabilized by N-(3-Aminopropyl)imidazole With Improved Optical Properties". Chem. Mater. 2006, 18. pp. 3463-3469. Jun. 22, 2006.*

(Continued)

*Primary Examiner* — C Melissa Koslow
(74) *Attorney, Agent, or Firm* — Kaplan Breyer Schwarz, LLP

(57) ABSTRACT

Intrinsic broadband white-light emitting phosphors and a solution-state method for producing them are disclosed. Emitters in accordance with the present invention include layered perovskite-based phosphors that comprise metals and halides and have an emission spectrum that spans the entire visible-light spectrum.

16 Claims, 11 Drawing Sheets

(56) References Cited

U.S. PATENT DOCUMENTS

| | | | |
|---|---|---|---|
| 6,429,318 B1 | 8/2002 | Mitzi | |
| 6,716,927 B2 * | 4/2004 | Takeoka | C08F 38/02 |
| | | | 522/137 |
| 6,787,250 B2 * | 9/2004 | Shibuya | G01T 1/2018 |
| | | | 250/370.11 |
| 7,087,904 B2 * | 8/2006 | Shibuya | C09K 11/664 |
| | | | 250/363.03 |
| 9,908,906 B2 * | 3/2018 | Ma | H01L 51/0032 |
| 10,087,366 B2 * | 10/2018 | Dohner | C09K 11/08 |
| 10,193,088 B2 * | 1/2019 | Lee | C01G 21/16 |
| 10,923,636 B2 * | 2/2021 | Lee | H01L 33/505 |
| 10,927,613 B2 * | 2/2021 | Rafie | E21B 17/023 |
| 10,950,761 B2 * | 3/2021 | Pathak | C09K 11/06 |

OTHER PUBLICATIONS

Sun et al, "Functional Perovskite Hybrid of Polyacetylene Ammonium and Lead Bromide: Synthesis, Light Emission, and Fluorescence Imagining", The Journal of Physical Chemistry B, vol. 110, pp. 21701-21709, DOI: 10.1021/ip0646269, dated Dec. 1, 2006.

Notice of Allowance received for U.S. Appl. No. 15/031,561, dated May 30, 2018, 7 pages.

Non-Final Rejection dated Feb. 6, 2018 for U.S. Appl. No. 15/031,561.

Li et al, "Novel <110>-Oriented Organic-Inorganic Perovskite Compound Stabilized by N-(3-Aminopropyl)imidazole wityh Improved OPtical Properties", Chem. Mater. 2006, 18, pp. 3463-3469, Jun. 22, 2006.

Ki et al, "A Semiconductor Bulk Material That Emits Direct White Light", Journal of the American Chemical Society, vol. 130, No. 26, pp. 8114-8115, DOI: 10.1021/ja801601y, dated Jun. 5, 2008.

Baikie et al, "Synthesis and crystal chemistry of the hybrid perovskite (CH3NH3)PbI3 for solid-state sensitised solar cell applications", Journal of Materials Chemistry A, Royal Society of Chemistry, vol. 1, No. 18, pp. 5628-5641, dated 2013, Country of Publication: SG.

Authorized Officer Jeong a. Lee, "International Search Report and Written Opinion", issued in counterpart International Application No. PCT/US2014/061946, dated Oct. 23, 2014.

Applicant Initiated Interview Summary (PTOL-413) dated Apr. 25, 2018 for U.S. Appl. No. 15/031,561.

\* cited by examiner

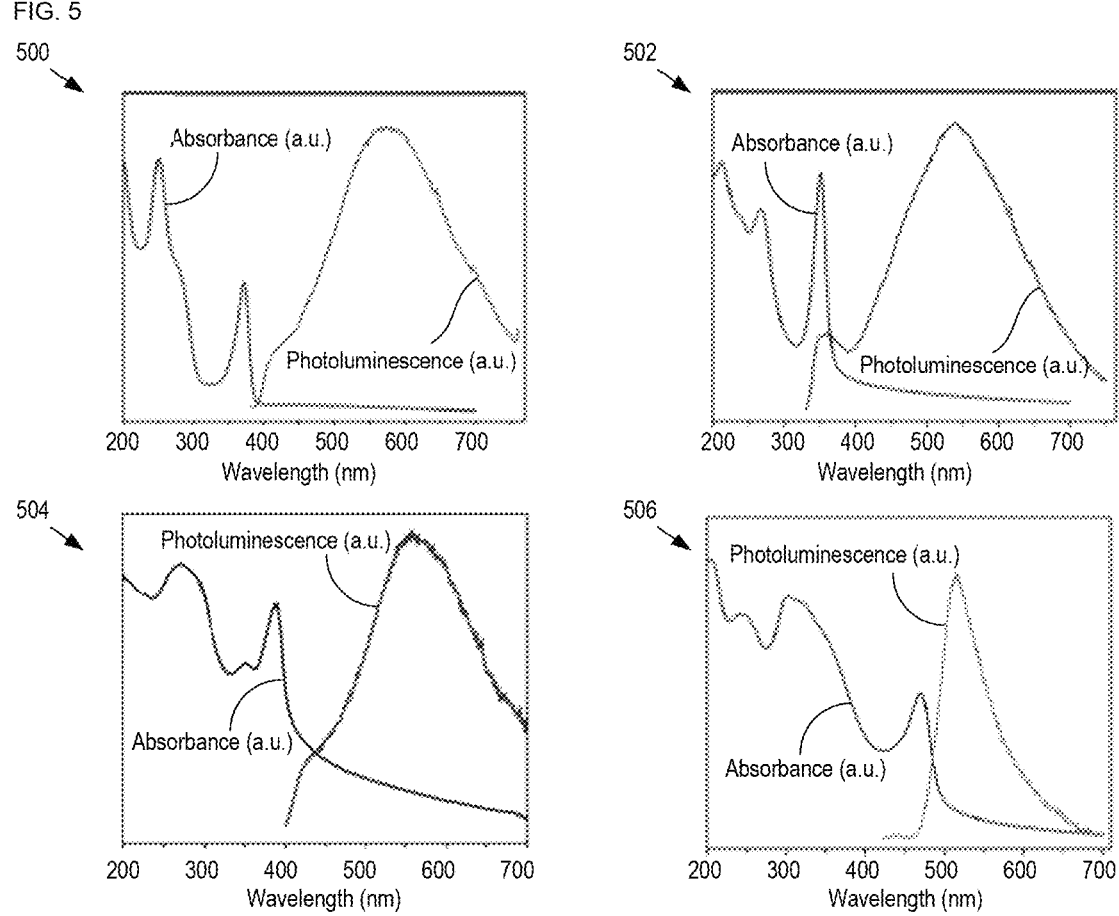

TWO-DIMENSIONAL PEROVSKITE PHOSPHOR AND METHOD OF FORMATION

CROSS REFERENCE TO RELATED APPLICATIONS

This case is a continuation of U.S. patent application Ser. No. 15/031,561, filed Apr. 22, 2016, now U.S. Pat. No. 10,087,366, which claims priority of U.S. Provisional Patent Application 61/894,553 entitled "Light Emitting Device and Method of Formation," filed Oct. 23, 2013 and U.S. Provisional Patent Application 62/039,663, entitled "Composition Comprising a Layered Perovskite Phosphor and Method of Formation," filed Aug. 20, 2014, each of which is incorporated herein by reference in its entirety.

FIELD OF THE INVENTION

The present invention relates to electronic devices in general, and, more particularly, to solid-state light sources.

BACKGROUND OF THE INVENTION

Incandescent and fluorescent light sources have been the mainstay of traditional lighting for residential and commercial applications for many decades. Unfortunately, these light sources have inherent energy inefficiencies, which have driven a search for improved light sources as the "green revolution" has progressed.

Because solid-state lighting (SSL) sources promise improved energy efficiency, they have become attractive alternatives to traditional lighting. The transition to SSL has been projected to reduce global electricity used for lighting by 50% by the year 2025. In addition, unlike most traditional lighting sources, the emission wavelengths from many SSL light sources can be controlled to effect a desired "color temperature."

Color temperature refers to the color characteristics of light. Light whose hue tends toward yellow (e.g., that emitted by tungsten-based household incandescent lamps) is typically considered "warm," while light having a hue that is more toward blue (e.g., that emitted by conventional fluorescent lamps) is typically considered "cool." The Color Rendering Index (CRI) is a scale, from 1 to 100, that is based on the ability of a light source to accurately render all colors of its spectrum (as compared to a "perfect" black-body light source). The lower a source's CRI rating, the less accurately colors will be reproduced by that source. Normally, a CRI of at least 90 is considered desirable, and indoor light applications typically require CRI values of at least 80.

Conventional SSL sources that are based on rare-earth-doped phosphors (e.g., $Ce^{3+}$-activated yellow phosphors, etc.) are excited into emission by absorption of light from blue-wavelength light-emitting diodes (LEDs). These sources generally have poor color rendering properties because they employ phosphors that do not emit across the entire visible light spectrum. Such prior-art phosphors typically lack a red component in their output light; therefore, they produce a white light that appears cold to the eye (i.e., its hue is more "bluish"). CRI indices greater than 90 have been realized in multi-phosphor systems, but these systems generally suffer from poor efficiency due to self-absorption. In addition, the different individual phosphors degrade at a different rates, leading to white light that becomes colored over time. Further, single and mixed phosphors require synthesis at high temperature (typically 1300-1900° C.), making their production complex and expensive.

To circumvent these problems, there has been recent emphasis on research into single-phase broadband white-light emitting phosphors suitable for SSL sources. Two-dimensional, cadmium-sulfide/selenide materials offer some promise and examples of such phosphors are described by W. Ki, et al., in "A Semiconductor Bulk Material That Emits Direct White Light," *J. Am. Chem. Soc.*, Vol. 130, page 8114 (2008). These materials demonstrated that a photoluminescence quantum efficiency (PLQE) of 4-5% could be achieved. The inclusion of cadmium, however, is generally considered undesirable due to its toxicity.

It has been shown that, by using substitution chemistry, $Mn^{2+}$ doping, and crystal engineering, PLQE can be improved by up to 37%, as reported by M. Roushan, et al., in "Solution-Processable White-Light-Emitting Hybrid Semiconductor Bulk Materials with High Photoluminescence Quantum Efficiency," *Chem., Int. Ed.*, Vol. 51, page 436 (2012). Unfortunately, while these results show progress toward a suitable white-light-emitting phosphor, the reported materials are expensive to synthesize, lack highly defined structure, and include materials that are toxic to humans.

Other emerging SSL technologies include cadmium-selenide nanocrystal-based sources. Nanostructures characterized by high surface-to-volume ratio (e.g. 1.5-nm quantum dots) have shown white-light emission due to surface states that lead to sub-band-gap electronic states. Quantum-dot sources based on this technology have shown excellent color-rendering properties. Unfortunately, particle aggregation can quench emission; therefore, a dispersive polymer is typically required to prevent such aggregation. Most polymers, however, tend to degrade rapidly under constant exposure to ultraviolet light, thereby limiting the lifetime of these sources. In addition, as mentioned above, the toxicity of cadmium represents an additional disadvantage in such devices. Further, in order to realize nanocrystals having precise size, complex processing techniques are needed making these sources expensive.

To date, a viable single-phase, low-cost, long-term-stable, white-light-emitting phosphor has yet to be realized.

SUMMARY OF THE INVENTION

The present invention makes possible cost-effective, single-phase, white-light emitting SSL light sources by enabling low-cost, broadband-emission, single-source, white-light phosphors suitable for use with ultraviolet light-emitting diode excitation sources. Phosphors in accordance with the present invention have a two-dimensional perovskite-based crystal structure comprising alternating organic and inorganic layers, have emission spectra that can span the entire visible-light spectrum, where the white-light emission of the phosphor arises from the inorganic layers of the bulk material of the perovskite structure, and can be formed in a low-cost, solution-state synthesis at room temperature or below. Embodiments of the present invention are particularly well suited for use in solid-state lighting applications, architainment lighting, and alternative-energy applications.

In contrast to phosphors of the prior art, which require emissive dopants (e.g., $Eu^{3+}$, $Ce^{3+}$) or surface sites (e.g., quantum dots), the present invention enables phosphors having emission that is an intrinsic bulk property and that has a broader emission spectrum.

An illustrative embodiment of the present invention is a phosphor comprising a metal-halide ($PbBr_4$) inorganic structure within an organic-inorganic hybrid material having a two-dimensional hybrid perovskite crystal structure. The phosphor emits light that spans the entire visible-light spectrum. In some embodiments, phosphors include other metal-halides and metal-halide mixtures, such as $PbBr_{4-x}Cl_x$, $PbCl_4$, $PbI_4$, and the like.

A method for forming phosphors in accordance with the present invention is a solution-state-synthesis process that includes forming a liquid solution containing an organic cation solution in a hydrohalic acid and an inorganic compound dissolved in the hydrohalic acid, where the inorganic compound includes the desired metal and halide. The desired phosphor crystalizes and precipitates out of the solution, typically while the solution is stirred, and while the solution is kept at or below room temperature. Once formed, the phosphors can be deposited on a desired surface by dissolving them in a solvent solution, dispensing the phosphor/solvent solution onto the desired surface, and enabling the removal of the solvent (e.g., via evaporation).

In some embodiments, the broadband emission characteristics of a phosphor are controlled to provide light that ranges from "warm" white light, typically sought for indoor lighting, to "cold" white light that approximates sunlight. In some embodiments, the emission characteristics are controlled by forming the phosphor such that it comprises multiple halides and controlling the ratio of the different halides.

In some embodiments, phosphors in accordance with the present invention are electroluminescent. Such phosphors are suitable for use in active light sources, such as light-emitting diodes (LEDs).

In some embodiments, phosphors in accordance with the present invention are doped with strongly luminescent centers to improve their PLQEs.

In some embodiments, phosphors in accordance with the present invention are included in a solar-cell energy-conversion system. In such embodiments, UV light that cannot be absorbed by the solar cell is incident on the phosphors, which excites the phosphors to emit radiation that is within the absorption spectrum of the solar cell—thereby improving the energy-conversion efficiency of the solar cell.

An embodiment of the present invention is a phosphor comprising: a first metal; a first halide; and at least one organic layer; wherein the phosphor is a layered hybrid perovskite; and wherein the phosphor emits light having a spectrum that is continuous and spans at least the wavelength range from approximately 400 nm to approximately 700 nm.

Another embodiment of the present invention is a method comprising: mixing a first liquid and a second liquid to form a first solution, the first liquid comprising an organic cation dissolved in a first hydrohalic acid and the second liquid comprising a metal-based reagent dissolved in the first hydrohalic acid, wherein the metal-based reagent comprises a first metal and the first hydrohalic acid comprises a first halide; enabling the precipitation of a first phosphor from the first solution, wherein the first phosphor is a layered hybrid perovskite that includes the first metal and the first halide, and wherein the first phosphor emits light having a spectrum that is continuous and spans at least the wavelength range from approximately 400 nm to approximately 700 nm.

Yet another embodiment of the present invention is a phosphor comprising: a first inorganic sheet comprising a first metal and a first halide; and a first organic layer; wherein the first inorganic sheet and first organic layer collectively define a layered hybrid perovskite crystal structure; and wherein the first inorganic layer emits light having a spectrum that is continuous and spans at least the wavelength range from approximately 400 nm to approximately 700 nm.

BRIEF DESCRIPTION OF THE DRAWINGS

FIG. 5 depicts plots of measured absorption and photoluminescence data for phosphors 300, 304, 308, and 310.

DETAILED DESCRIPTION

The following terms are defined for use in this Specification, including the appended claims:
  visible-light spectrum is defined as the wavelengths within the range of approximately 400 nanometers (nm) to approximately 700 nm.
  Two-dimensional hybrid perovskite crystal structure is defined as a perovskite crystal structure having alternating layers of organic molecules and inorganic components comprised of corner-sharing metal-halide octahedra.
  room temperature is defined as a temperature within the range of approximately 20° C. to approximately 26° C.

Technology Overview

The present invention enables stable, single-phase white-light emitting phosphors that can be formed using low-cost, simple solution-state synthesis. The crystal structure of these phosphors is a hybrid perovskite crystal structure that comprises alternating layers of organic and inorganic components. Phosphors in accordance with the present invention are characterized by broadband emission that substantially spans the complete visible-light spectrum, where the emission arises from bulk effects within the crystal structure specifically, from the inorganic layers (i.e., sheets) of the hybrid perovskite crystal structure themselves. As a result, the present invention enables phosphors that are more tunable and that can have longer lifetime than prior-art phosphors.

In contrast to the present invention, prior-art phosphor materials, such as CdSe quantum dots, are characterized by white-light emission that has been attributed to mid-bandgap states arising from deep traps at surface sites. Unfortunately, such emission has a strong dependence on particle size and is readily quenched by particle aggregation.

It is an aspect of the present disclosure that the electronic structures of layered metal-halide perovskites show narrow bands conducive for charge localization. Due to its low dielectric constant, the organic layer provides poor shielding between photogenerated electrons and holes in the inorganic layer, resulting in more strongly bound excitons compared to three-dimensional perovskites. The emission's dependence on temperature and excitation power density are consistent with tightly bound excitons that are further stabilized as self-trapped excitons or as separately trapped electrons/holes through coupling to lattice distortions. Furthermore, white-light emission has been observed only from perovskites with (110) sheets and distorted (100) sheets, suggesting that the emission is influenced by the bulk crystal structure.

Figure 1:
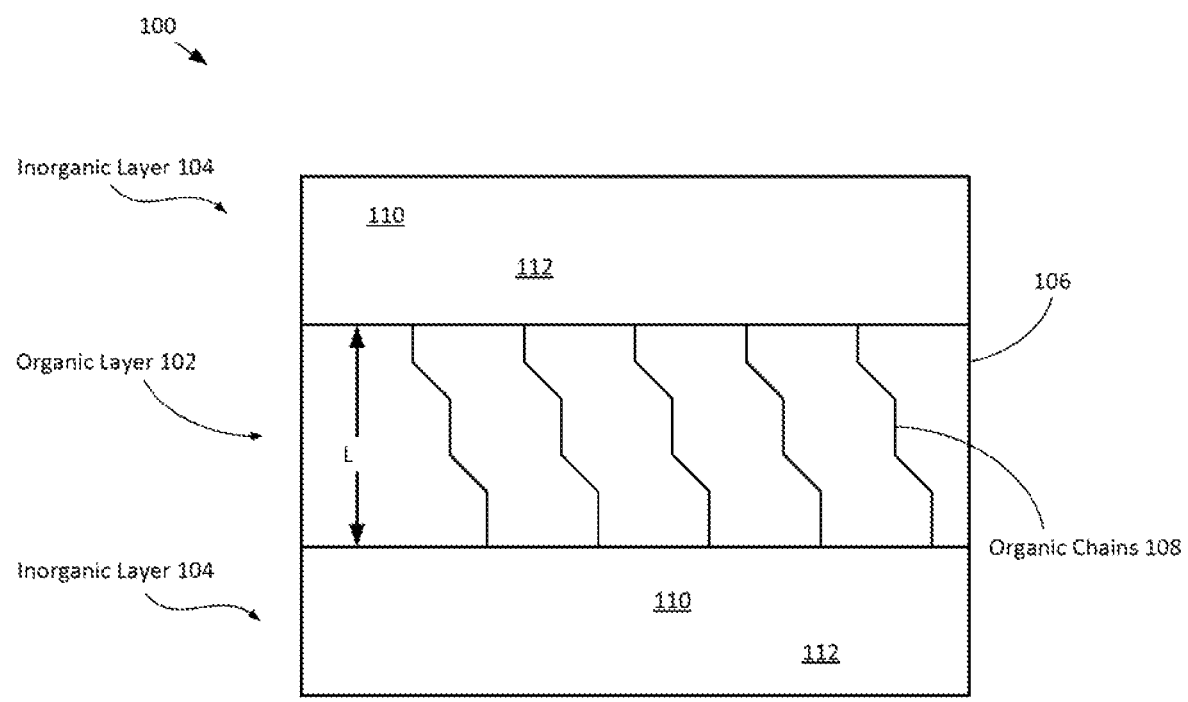
FIG. 1 depicts a schematic drawing of a portion of a generalized phosphor structure in accordance with the present invention.

FIG. 1 depicts a schematic drawing of a portion of a generalized phosphor structure in accordance with the present invention. Phosphor 100 includes organic layer 102 and inorganic layers 104, which collectively define a hybrid perovskite crystal structure.

Organic layer 102 comprises organic molecule 106, which includes organic chains 108. Organic cations suitable for use in embodiments of the present invention include, without limitation, EDBE (2,2'-(ethylenedioxy)bis(ethylammonium)), N-MEDA ($N^1$-methylethane-1,2-diammonium), N-MPDA ($N^1$-methylpropane-1,3-diammonium), and the like.

Each of inorganic layers 104 is a crystalline metal-halide layer comprising atoms of metal 110 and atoms of at least one halide (i.e., halide 112 might include one or more halides or include a mixed halide). Inorganic layers 104 can be characterized as flat or corrugated metal-halide sheets that are separated by length L, where L is based on the length of organic chains 108.

The metal-halide structures of inorganic layers 104 behave as wide-bandgap semiconductors—similar to the electronic structures of nanostructures terminated by wide-bandgap capping groups. Further, the dielectric mismatch between organic layer 102 and inorganic layers 104 gives rise to strongly bound excitons. The present invention, therefore, enables the electronic properties of quantum-confined systems, such as those discussed above. Such nanostructures, however, have significant size distribution and can require specialized processing techniques. In contrast, phosphor 100 is a bulk crystalline material that is formed in a solution-state, self-assembly reaction, wherein the thickness of inorganic layers 104 is determined by their crystal structure and orientation. As a result, the present invention enables phosphors having little or no size distribution effects between syntheses.

It is an aspect of the present invention that the crystal orientation and/or structure of inorganic layers 104 is dictated by L. As a result, the choice of organic molecule used in phosphor 100 is typically made based on the desired crystal orientation of the inorganic layers. It should be noted that the emission characteristics of phosphor 100 are affected by its crystal orientation/structure.

Figure 2A:
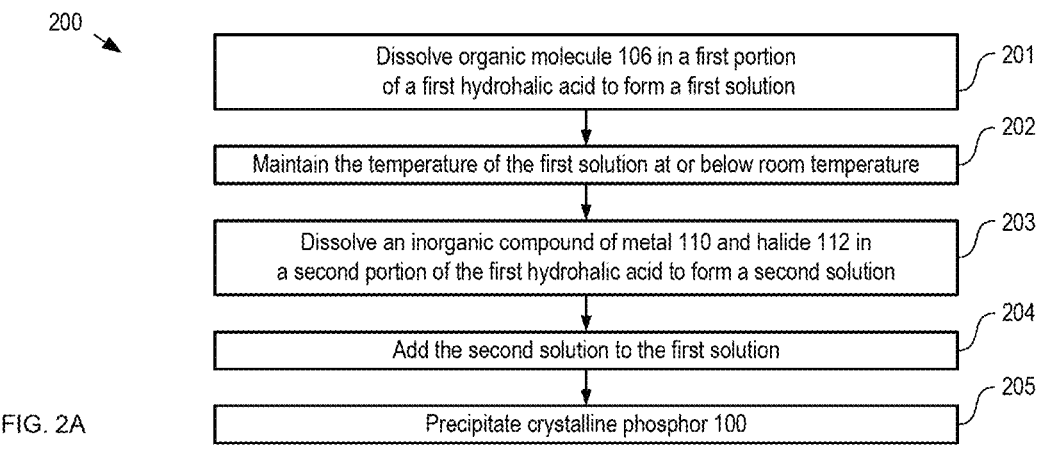
FIG. 2A depicts operations of a method suitable for forming a phosphor in accordance with the illustrative embodiment of the present invention.

FIG. 2A depicts operations of a method suitable for forming a phosphor in accordance with the illustrative embodiment of the present invention. Method 200 begins with operation 201, wherein a first liquid solution is prepared by dissolving organic molecule 106 in a first portion of a first hydrohalic acid (formed from hydrogen and halide 112) to form an organic cation.

As operation 202, the temperature of the first liquid solution is maintained at or below room temperature.

At operation 203, a second liquid solution is prepared by dissolving a first inorganic compound in a second portion of the first hydrohalic acid, where the first inorganic compound comprises metal 110 and halide 112.

At operation 204, the second solution is added to the first solution to form a third solution.

At operation 205, phosphor 100 is precipitated out of the third solution. In some embodiments, phosphor 100 is precipitated by cooling the third solution. In some embodiments, phosphor 100 is precipitated by heating the third solution to an elevated temperature (e.g., 60-100° C., etc.) at which it is saturated, then cooling the third solution to a temperature at which the phosphor will precipitate, such as a temperature that is at or below room temperature. In some embodiments, phosphor 100 is precipitated by enabling a solvent (e.g., an organic solvent such as acetone, etc.) to diffuse (e.g., through vapor-phase diffusion, etc.) into the third solution.

The solution-state assembly of phosphor 100 is directed by the choice of the organic cation included in the solution specifically, the length of organic chains 108 and hydrogen-bonding interactions between the organic molecule and the inorganic sheets. For example, in some embodiments, a short-length organic cation is used to dictate assembly of (110) perovskite crystals. In other embodiments, a longer-length organic cation is used to dictate assembly of (001) perovskite crystals.

Figure 7A:
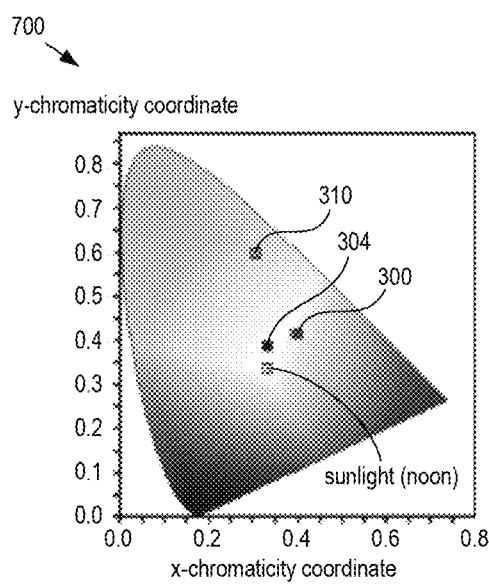
FIGS. 7A-B depict plots of the chromaticity coordinates for phosphors in accordance with the present invention.
Figure 7B:
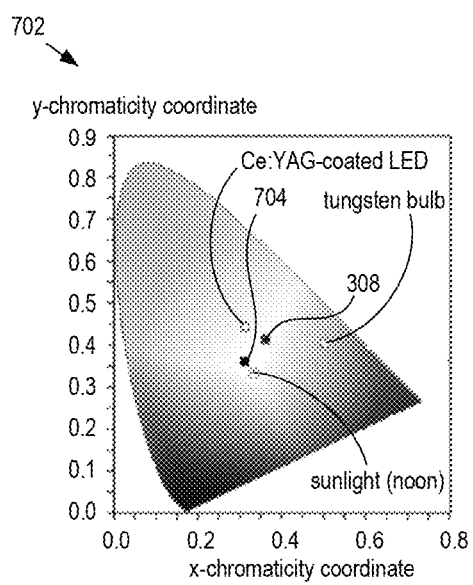
Figure 8A:
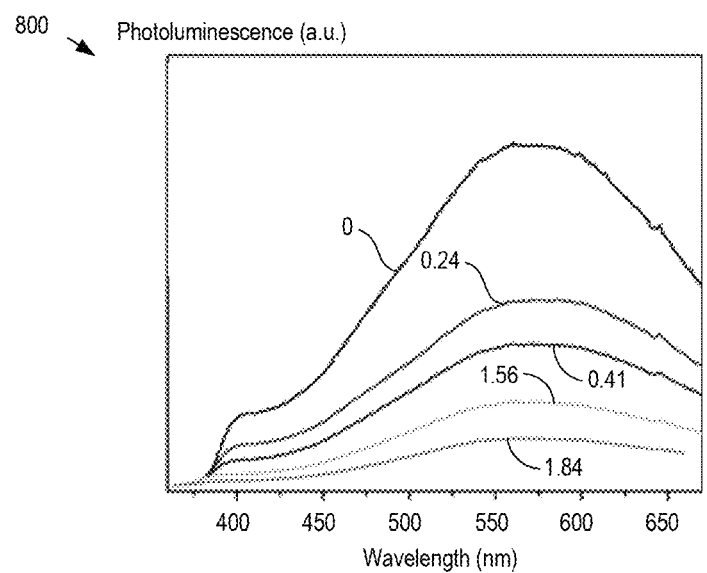
FIG. 8A depicts measured photoluminescence for a mixed-halide phosphor for different halide ratios.
Figure 8B:
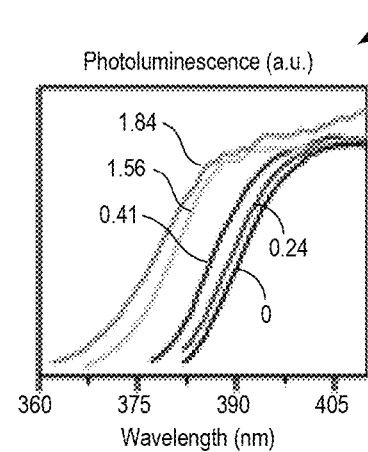
FIG. 8B depicts the effect of halide substitution on a high-energy shoulder within the photoluminescence spectra of plot 800.

In some embodiments, the shape (e.g., peak wavelength, spectral shift of some portions of the spectrum, tuning CIE chromaticity coordinates and color-rendering index CRI, etc.) of the emission spectrum of phosphor 100 is controlled by controlling the ratio of the first halide with a second halide included in inorganic layers 102 (e.g., see FIGS. 7B, 8A, and 8B and corresponding disclosure for illustration).

Figure 2B:
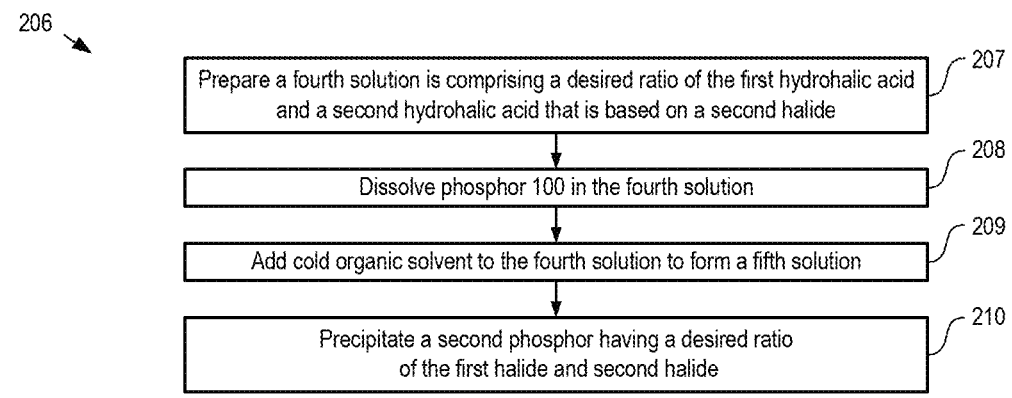
FIG. 2B depicts operations of a solution-state substitution process for forming a mixed-halide phosphor and controlling the ratio of the halides in the phosphor in accordance with the present invention.
Figure 3A:
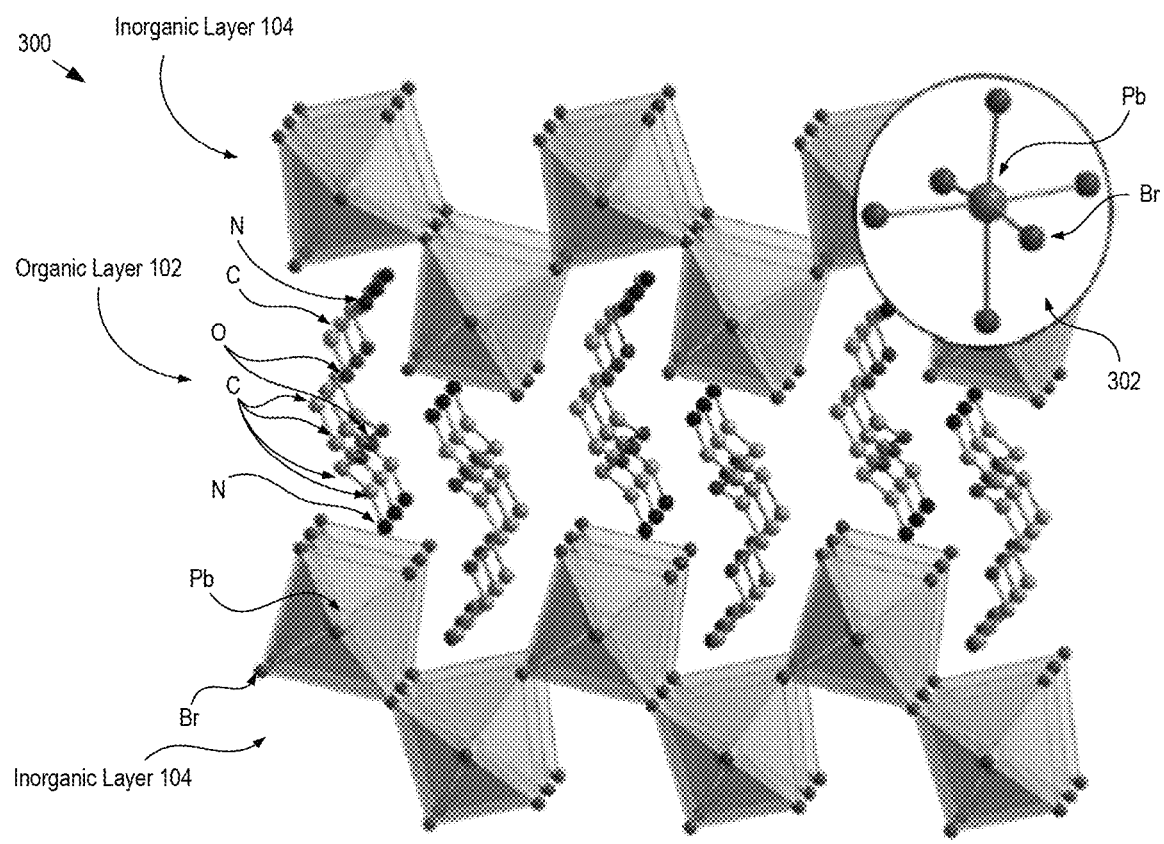
FIGS. 3A-D depict schematic drawings of the crystal structure of exemplary phosphors in accordance with the present invention.
Figure 3B:
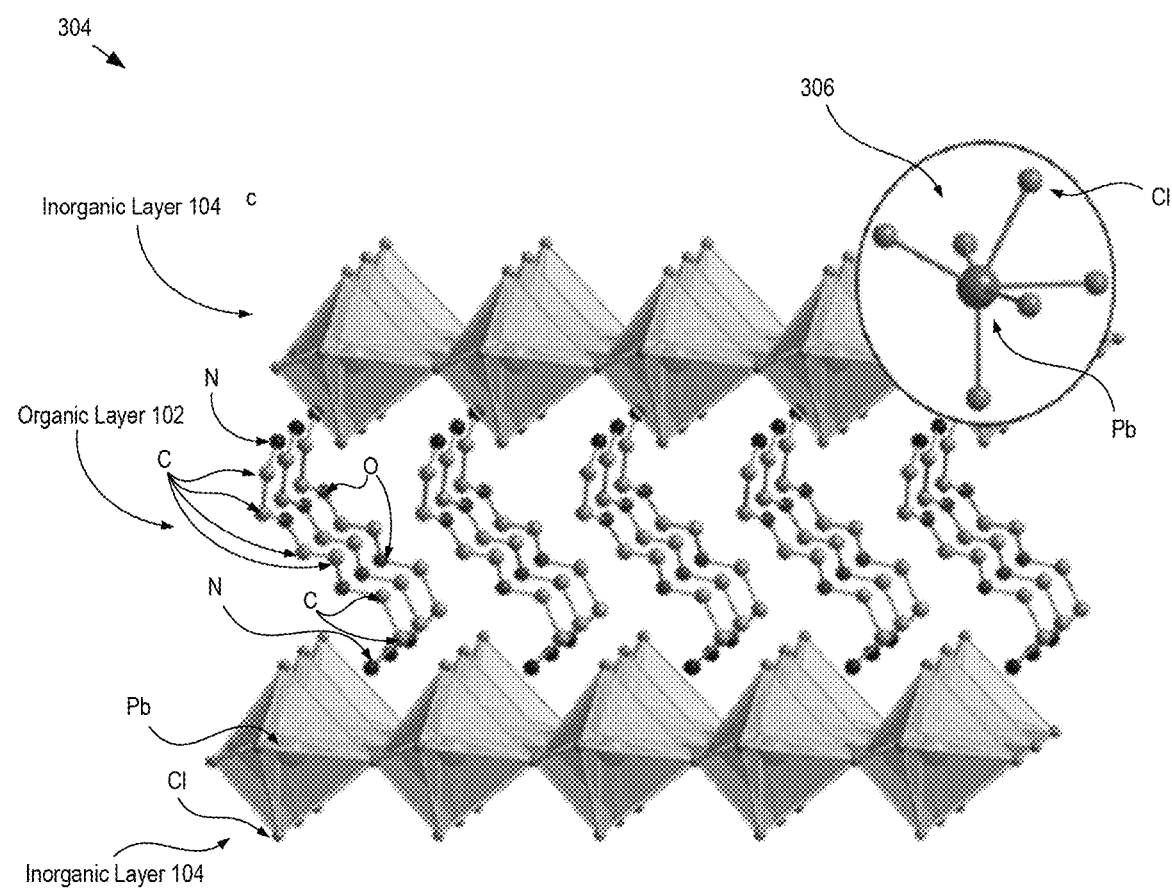
Figure 3C:
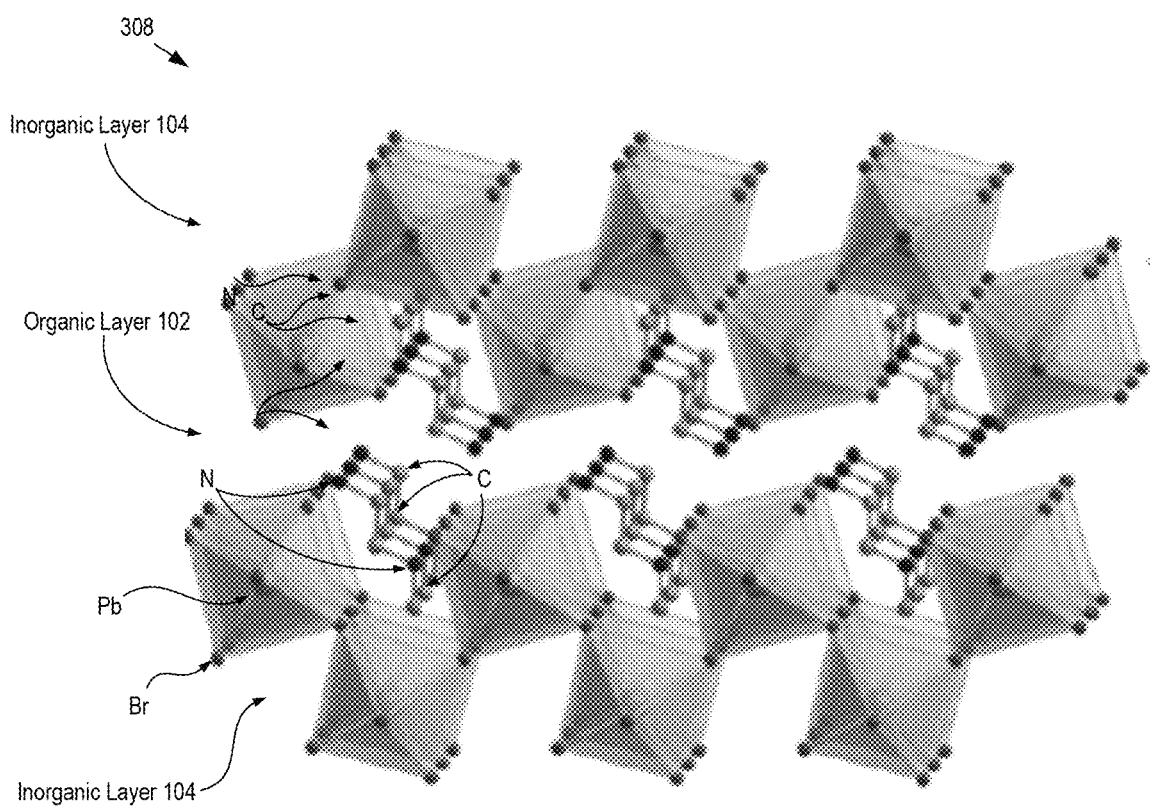
Figure 3D:
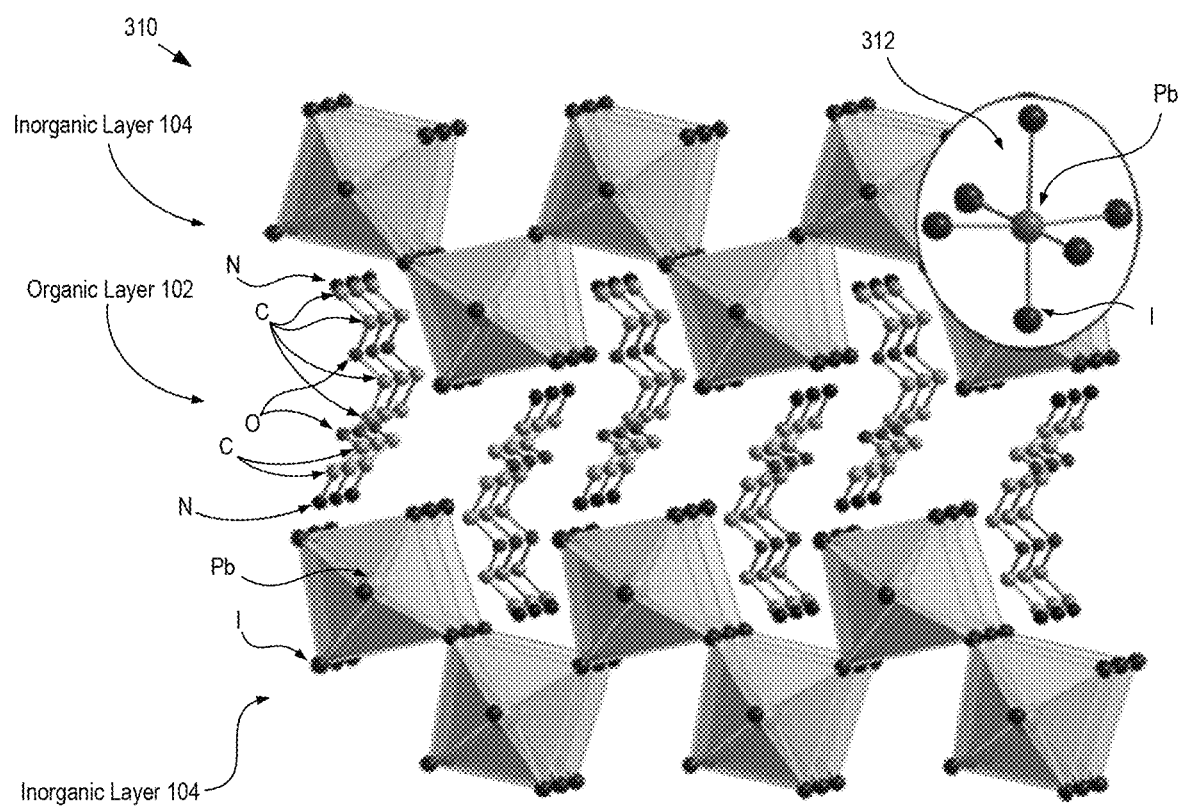

FIG. 2B depicts operations of a solution-state substitution process for forming a mixed-halide phosphor and controlling the ratio of the halides in the phosphor in accordance with the present invention. Method 206 begins with operation 207, wherein a fourth solution is prepared, the fourth solution comprising a specific ratio of the first hydrohalic acid and a second hydrohalic acid that is based on a second halide.

At operation 208, the crystalline material of phosphor 100, which was obtained in operation 205, is dissolved in the fourth solution to form a fifth solution.

At operation 209, a cold organic solvent is added to the fifth solution.

At operation 210, a mixed-halide phosphor is precipitated from the fifth solution. The inorganic layers of the precipitated mixed-halide phosphor includes the first and second halides in a specific ratio that is based on the ratio of the first and second hydrohalic acids in the third solution.

It should be noted that, instead of adding a cold solvent to the fifth solution, the mixed-halide phosphor can be precipitated from the fifth solution by using another known prior-art technique or any of the techniques described above and with respect to operation 205.

It should also be noted that phosphors in accordance with the present invention can deposited on a desired surface using techniques analogous to prior-art solution-state methods used to deposit organic phosphors. As a result, the present invention enables applications wherein inexpensive, large-area coatings of broadband-emitting phosphors are desirable.

Turning now to specific embodiments, FIGS. 3A-D depict schematic drawings of the crystal structure of exemplary phosphors in accordance with the present invention. Phosphors 300, 304, and 308 are examples of phosphors that emit light whose spectrum spans the entire white-light spectrum (i.e., phosphors 300, 304, and 308 are white-light emitting phosphors). Phosphor 310 is an example of a phosphor that emits light that does not span the entire white-light spectrum but, instead, emits predominantly green light (i.e., phosphor 310 is a green-light emitting phosphor); however, phosphor 310 can be formed using solution-state synthesis in accordance with the present invention.

Phosphor 300 is a layered perovskite crystal of (EDBE)[$PbBr_4$]. Phosphor 300 includes atoms of lead, bromine, oxygen, nitrogen, carbon, and hydrogen (not shown for clarity), which are arranged in corrugated lead-halide sheets that collectively define a hybrid perovskite crystal structure.

In phosphor 300 inorganic layers 104 have a (110) crystal structure having a generally octahedral metal coordination environment (as shown in inset 302). Hydrogen bonds between terminal ammonium groups and oxygen atoms in adjacent organic molecules enforce a paired configuration for EDBE cations in the phosphor, thereby stabilizing the (110) structure of inorganic layers 104.

Phosphor 304 is a layered perovskite crystal of (EDBE)[$PbCl_4$]. Phosphor 304 includes atoms of lead, chlorine, oxygen, nitrogen, carbon, and hydrogen (not shown for clarity).

In phosphor 304, inorganic layers 104 have a (100) crystal structure with a pronounced distortion from an octahedral geometry around the metal atoms (as shown in inset 306).

As discussed above and with respect to FIG. 1, organic molecules other than EDBE can be used without departing from the scope of the present invention. Phosphor 308 is an example of a phosphor in accordance with the present invention wherein organic molecule 106 is N-MEDA ($N^1$-methylethane-1,2-diammonium), rather than EDBE.

Phosphor 308 has a (110) crystal structure due, in part, to the short length of organic chains 108 in N-MEDA. The short polymer chain length inhibits the formation of (001) perovskite structure, as it would likely bring adjacent inorganic layers 104 too close together. As a dication, N-MEDA also cannot occupy the $A'$-site of a three-dimensional perovskite. Due to the corrugated nature of the (110) sheets (i.e., inorganic layers 104), the primary ammonium group of N-MEDA can form hydrogen bonds with halides from two adjacent inorganic sheets, likely stabilizing the (110) structure.

Phosphor 310 is a layered perovskite crystal of (EDBE)[$PbI_4$]. Phosphor 310 includes atoms of lead, iodine, oxygen, nitrogen, carbon, and hydrogen (not shown for clarity).

Like phosphor 300, the inorganic layers 104 in phosphor 310 have a (110) crystal structure having a generally octahedral metal coordination environment (as shown in inset 312). As described above, hydrogen bonds between terminal ammonium groups and oxygen atoms in adjacent organic molecules stabilize the crystal structure of inorganic layers 104 by enforcing a paired configuration for EDBE cations in the phosphor.

Figure 4:
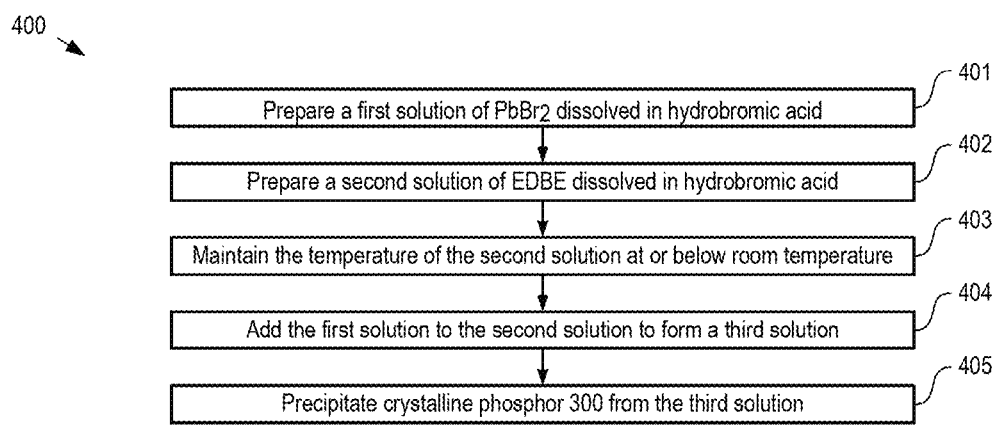
FIG. 4 depicts operations of a method for forming phosphor 300.

FIG. 4 depicts operations of a method for forming phosphor 300. Method 400 is a specific example of method 200, and begins with operation 401, wherein a first solution comprising lead(II)bromide (i.e., $PbBr_2$) dissolved in hydrobromic acid is prepared. An exemplary first solution is a 4-mL solution of $PbBr_2$ (1.00 g, 2.72 mmol) in 9-M HBr.

At operation 402, a second solution comprising EDBE dissolved in hydrobromic acid is prepared. An exemplary second solution is a 5-mL solution of EDBE (1.00 mL, 6.85 mmol) in 9-M HBr.

At operation 403, the second solution is stirred and its temperature is maintained at or below room temperature (e.g., −70° C.).

At operation 404, the first solution is added to the second solution to form a third solution.

After 10 minutes, at operation 405, phosphor 300 is precipitated out of the third solution, filtered using a glass frit, and washed with cold diethyl ether (5×5 mL).

One skilled in the art will recognize that the specific operations of method 400 are merely exemplary and that alternative operations suitable for forming phosphor 300 can be employed without departing from the scope of the present invention. Further, method 400 exemplifies operations suitable for forming other phosphors in accordance with the present invention (e.g., phosphors 304, 308, and 310, etc.) with appropriate substitution of halides. Still further, it will be clear that the concentrations and mixtures provided are merely examples of suitable concentrations and solution compositions.

FIG. 5 depicts plots of measured absorption and photoluminescence data for phosphors 300, 304, 308, and 310. Plots 500, 502, 504, and 506 depict data for phosphors 300, 304, 308, and 310, respectively.

The absorption spectra of phosphors 300, 304, 308, and 310 are similar to those of other two-dimensional lead-halide perovskites. The dielectric mismatch between organic and inorganic layers leads to strongly bound excitons, reflected in the sharp excitonic absorption bands at 351, 371, 395, and 470 nm for phosphors 304, 300, 308, and 310, respectively.

Upon excitation with light at 365-nm, phosphor 300 emits light whose emission spectrum spans the entire visible wavelength, with a maximum at 573 nm and a full width at half maximum (FWHM) of 215 nm (0.80 eV). It also exhibits a higher-energy shoulder at 410 nm.

In similar fashion, when excited with light having a wavelength of 310 nm, phosphor 304 also emits light whose emission spectrum spans the entire visible wavelength, with a maximum at 538 nm and an FWHM of 208 nm (0.95 eV). The emission spectrum of phosphor 304 also features a less intense but well-defined shoulder at 358 nm.

When excited with light at 410 nm, phosphor 308 emits light whose emission spectrum spans the entire visible wavelength, with a maximum at 558 nm and a full width at half maximum (FWHM) of 165 nm.

As briefly mentioned above, phosphors 300, 304, and 308 can be characterized as "white-light emitters," since they emit light whose spectra spans the entire white-light spectrum. The light emitted by phosphor 310, on the other hand, does not quite span the entire white-light spectrum and is generally concentrated in the 470 nm to 600 nm wavelength range. As a result, phosphor 310 can be generally characterized as a "green-light emitter." One skilled in the art will recognize, after reading this Specification, that, while a green-light emitter has limited utility as compared to a white-light emitter, the ability to form a green-light emitter using low-cost solution-state synthesis in accordance with the present invention still affords embodiments of the present invention based on phosphor 310 advantages over the prior art.

As can be seen from plot 506, phosphor 310 displays a sharper green emission spectrum centered at 515 nm in response to excitation at 400 nm, with a FWHM of 70 nm (0.32 eV). It should be noted that the emission spectrum of phosphor 310 does not quite span the entire visible-light spectrum, covering wavelengths within the range of approximately 450 nm to approximately 700 nm.

It should be noted that the very large Stokes shifts exhibited by phosphors 300, 304, 308, and 310 advantageously lead to low self-absorption in these materials.

As discussed above, in contrast to prior-art phosphors, the white-light emission of phosphors in accordance with the present invention arises due to bulk effects in their crystal structure and, in some embodiments, within the metal-halide inorganic sheets. This is illustrated by exemplary mechanistic studies of phosphor 300, which indicate that its white-light emission likely includes contributions from both distorted excited states due to strong electron-phonon coupling in a deformable lattice as well as inhomogeneous broadening resulting from a distribution of trap states. One skilled in the art will recognize, after reading this Specification, that strong coupling of excited electrons/holes to lattice deformations can lead to a broad emission with a pronounced Stokes shift (as evinced by plot 500 in FIG. 5A) due to stabilized, distorted electronic states. It was found that, consistent with electron-lattice coupling, the broad emission of phosphor 300 becomes more intense and narrower with increasing temperature. Accordingly, the PLQE of phosphor 300 was found to increase with decreasing temperature from 9% at 300 K to reach 85(1)% at 105 K.

Further, one skilled in the art would recognize that white-light emission due to surface defects would be particle-size dependent. The emission characteristics of phosphors in accordance with the present invention, however, are substantially size-independent.

Figures 6A, 6B:
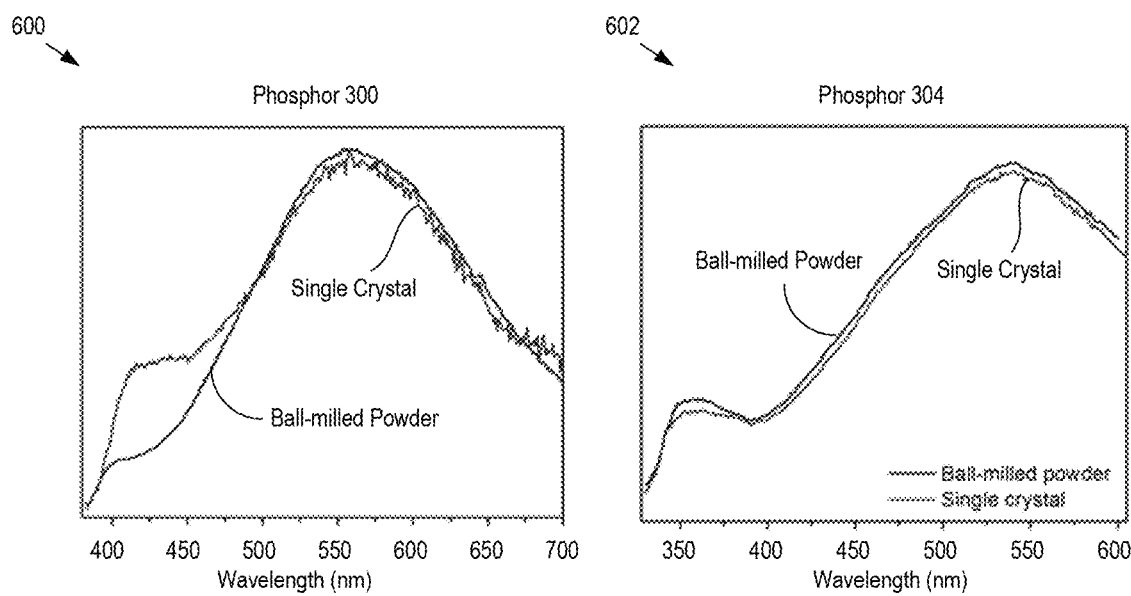
FIGS. 6A and 6B depict plots of photoluminescence intensity as a function of wavelength for single crystals and ball-milled powders of two exemplary phosphors.

FIGS. 6A and 6B depict plots of photoluminescence intensity as a function of wavelength for single crystals and ball-milled powders of two exemplary phosphors. Plots 600 and 602 depict the photoluminescence for samples of phosphors 300 and 304, respectively. Single crystals of phosphor 300 have a particle size of 1×0.4×0.1 cm, while single crystals of phosphor 304 have a particle size of 1×0.5×0.1 cm. The ball-milled powders of each phosphor have a particle size of ca. 1 micron.

It be seen from each of plots 600 and 602 that the emission spectra for the two different sizes of particulates of the two phosphors are virtually identical, indicating that their emissions are not due to defects at the crystal surface but are, instead, due to bulk effects.

FIGS. 7A-B depict plots of the chromaticity coordinates for phosphors in accordance with the present invention.

Plot 700 indicates the chromaticity coordinates for phosphors 300, 304, and 310 as compared to bright sunlight. The emission from phosphor 300 has CIE chromaticity coordinates of (0.39, 0.42), with a larger contribution from the red region of the spectrum compared to pure white light, which has chromaticity coordinates of (0.33, 0.33). This gives the emission from phosphor 300 a correlated color temperature (CCT) of 3990 K, which corresponds to 'warm' white light that is ideal for indoor illumination. The broad emission also leads to a high color-rendering index (CRI) of 84. By way of comparison, the emission from phosphor 304 has CIE coordinates of (0.33, 0.39), which corresponds to a CCT of 5509 that affords 'cold' white light, and a CRI of 81.

Plot 702 indicates the chromaticity coordinates for phosphor 308 as compared to bright sunlight, as well as a conventional incandescent light source—namely, a tungsten filament. Like phosphor 300 (also based on a lead-bromine halide crystal), phosphor 308 has significant emission intensity in the red region of the visible spectrum. As a consequence, its emission lies to the yellow side of pure white light with a CIE of (0.36, 0.41) and a CCT of 4669 K. As a result, both of phosphors 300 and 308 emit "warm" white light.

As discussed above, it is an aspect of the present invention that shape of the emission spectrum of a metal-halide phosphor can be tuned via halide substitution in a solution-state reaction. Plot 702 also indicates the chromaticity coordinates for exemplary tuned phosphor 704, which is a mixed-halide phosphor that includes both bromine and chlorine atoms and has the formula (N-MEDA)[PbBr$_{2.8}$Cl$_{1.2}$].

Phosphor 704 is formed in a manner analogous to method 206 described above and with respect to FIGS. 1 and 2.

In a first exemplary method, 0.01 grams of crystalline phosphor 308 is dissolved in 0.4 mL of a solution having a 5:3 mol ratio of HBr and HCl. This solution is then sonicated for several minutes to ensure complete dissolution of the solid phosphor material. Approximately 4 mL of cold acetone (e.g., 0° C.) is then added to the first solution. This second solution is then sonicated again for several minutes, after which a crystalline precipitate of phosphor 704 is realized. Typically, the precipitate is then filtered, washed with an organic solvent (e.g., acetone), and dried in reduced pressure atmosphere.

It should be noted that the choice of organic molecule 106 within the phosphor does not significantly affect the ability to perform halide substitution in the manner described herein. For example, in a second exemplary method, 0.05 grams of crystalline phosphor 300 is dissolved in a 1 mL aqueous solution having a ratio of 9-M HBR:12-M HCl. This solution is then sonicated for several minutes to ensure complete dissolution of the solid phosphor 300. As in the first exemplary method, approximately 4 mL of cold acetone (e.g., 0° C.) is then added to the first solution and the second solution is then sonicated for several minutes to realize a crystalline precipitate of a second phosphor having a desired ratio of bromine and chlorine.

By controlling the ratio of the hydrohalic acids, the ratio of the two halide atoms in the crystal structure can be controlled. For example, dissolving phosphor 300 in solutions having ratios of HBr:HCl of 1:0, 1:1, 2:3, 3:5, and 1:4 results in mixed-halide phosphors having the formula (EDBE)[PbBr$_{4-x}$Cl$_x$], where x=0, 0.24, 0.41, 1.56, and 1.84, respectively.

FIG. 8A depicts measured photoluminescence for a mixed-halide phosphor for different halide ratios. Plot 800 includes photoluminescence data for a phosphor having the formula (EDBE)[PbBr$_{4-x}$Cl$_x$], where x=0, 0.24, 0.41, 1.56, and 1.84, as indicated.

It can be seen from plot 800 that, while the intensity of the mixed-halide phosphor decreases with increasing chlorine content, the center wavelength and FWHM of the emission spectrum remains substantially unchanged.

FIG. 8B depicts the effect of halide substitution on a high-energy shoulder within the photoluminescence spectra of plot 800.

Plot 802 shows that there is a marked blueshift with increasing chloride content in the mixed-halide phosphor. This spectral content enables control over the CIE coordinates of the phosphor. This control is exhibited in plot 702 described above, which shows CIE coordinates for phosphors 308 and 704, which have CIE coordinates of (0.36, 0.41) and (0.31, 0.36), respectively. It should be noted that, simply via halide substitution, the CIE coordinates of phosphor 704 are moved significantly closer to the desirable CIE coordinates of pure white light (0.33, 0.33).

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A phosphor comprising:
a layered hybrid perovskite comprising:
at least one metal-halide sheet that comprises $[PbCl_4]^{2-}$, $[PbBr_4]^{2-}$ or a mixture of $[PbCl_4]^{2-}$ and $[PbBr_4]^{2-}$; and
at least one organic layer that comprises organic molecules;
wherein the phosphor has a two-dimensional (100) perovskite crystal structure or a two-dimensional (110) perovskite crystal structure;
wherein the phosphor emits light having an emission spectrum that is continuous and spans at least the wavelength range from approximately 400 nm to approximately 700 nm; and
wherein the light is emitted by the at least one metal-halide sheet.

2. The phosphor of claim 1 wherein the organic molecules are selected from the group consisting of (2,2'(ethylenedioxy)bis(ethylammonium)) (EDBE) and (N1-methylethane-1,2-diammonium) (N-MEDA).

3. The phosphor of claim 1, wherein the at least one metal-halide sheet further includes a second halide, wherein the metal, the first halide, and second halide are arranged in the two-dimensional perovskite crystal structure, and wherein a shape of the emission spectrum is influenced by the ratio of the first halide and the second halide.

4. The phosphor of claim 1, wherein the at least one metal-halide sheet is the (110) perovskite crystal structure, and wherein the (110) perovskite crystal structure is corrugated.

5. The phosphor of claim 1 wherein the at least one metal-halide sheet is the (100) perovskite crystal structure.

6. A method comprising:
selecting organic molecules having an organic chain of a certain length;
mixing a first solution and a second solution to form a third solution, the first solution comprising a inorganic compound dissolved in a first hydrohalic acid and the second solution comprising the organic molecules dissolved in the first hydrohalic acid, wherein the inorganic compound comprises a metal and a first halide comprising $[PbCl_4]^{2-}$, $[PbBr_4]^{2-}$ or a mixture of $[PbCl_4]^{2-}$ and $[PbBr_4]^{2-}$ and wherein the first hydrohalic acid comprises the first halide; and
precipitating a first phosphor from the third solution, wherein the first phosphor comprises a layered two-dimensional perovskite that includes at least one metal-halide sheet comprising the metal and the first halide, and wherein the at least one metal-halide sheet emits light having a first emission spectrum that is continuous and spans at least the wavelength range from approximately 400 nm to approximately 700 nm;
wherein the organic molecules templates a two-dimensional (100) perovskite structure or a two-dimensional (110) perovskite crystal structure.

7. The method of claim 6 further comprising:
dissolving the first phosphor in a fourth solution including the first hydrohalic acid and a second hydrohalic acid that comprises a second halide;
adding a liquid to the fourth solution to form a fifth solution, the liquid containing an organic solvent, wherein the liquid is added while at a temperature below room temperature; and
precipitating a second phosphor from the fifth solution, wherein the second phosphor a layered two-dimensional perovskite that includes the metal, the first halide, and the second halide, wherein the second phosphor is operative for emitting light having a second emission spectrum that includes a visible-light spectrum, and wherein a shape of the second emission spectrum is influenced by a ratio of the first halide and second halide in the second phosphor.

8. The method of claim 6 wherein the precipitation of the first phosphor is by an operation selected from the group consisting of:
maintaining the temperature of the third solution at or below room temperature;
diffusing an organic solvent into the third solution; and
sub-operations including:
(i) forming the third solution such that it is a saturated solution at a first temperature that is greater than room temperature; and
(ii) cooling the third solution to a second temperature that is less than the first temperature.

9. The method of claim 6 wherein the organic molecules are selected from the group consisting of (2,2'-(ethylenedioxy)bis(ethylammonium)) (EDBE) and (N1-methylethane-1,2-diammonium) (N-MEDA).

10. The method of claim 6 wherein the at least one metal-halide sheet is the (110) perovskite crystal structure, and wherein the (110) perovskite crystal structure is corrugated.

11. The method of claim 6 wherein the at least one metal-halide sheet is the (100) perovskite crystal structure.

12. A phosphor comprising:
an inorganic sheet comprising a metal and a first halide comprising $[PbCl_4]^{2-}$, $[PbBr_4]^{2-}$ or a mixture of $[PbCl_4]^{2-}$ and $[PbBr_4]^{2-}$; and
an organic layer that comprises organic molecules;
wherein the inorganic sheet and organic layer collectively define a layered hybrid perovskite crystal structure, the crystal structure based on the organic molecules in the organic layer, and wherein the crystal structure is a (100) perovskite crystal structure or a (110) perovskite crystal structure; and
wherein the phosphor emits light having a spectrum that is continuous and spans at least the wavelength range from approximately 400 nm to approximately 700 nm, and wherein the emission arises from a bulk effect within the first inorganic sheet.

13. The phosphor of claim 12 wherein the organic molecules are selected from the group consisting of (2,2'-(ethylenedioxy)bis(ethylammonium)) (EDBE) and (N1-methylethane-1,2-diammonium) (N-MEDA).

14. The phosphor of claim 12 wherein the inorganic sheet further comprises a second halide, wherein the shape of the spectrum is influenced by the ratio of the first halide and the second halide.

15. The phosphor of claim 12 wherein the inorganic sheet is the (110) perovskite crystal structure, and wherein the (110) perovskite crystal structure is corrugated.

16. The phosphor of claim 12 wherein the inorganic sheet is the (100) perovskite crystal structure.

* * * * *